United States Patent [19]
Kim et al.

[11] Patent Number: 5,983,294
[45] Date of Patent: Nov. 9, 1999

[54] SYNCHRONOUS CROSS-CONNECT SYSTEM WITH THE FUNCTION OF RING NETWORK INTERWORKING USING BACKPLANE INTERCONNECTION

[75] Inventors: Hong-Ju Kim; Dong-Choon Lee; Chang-Ki Lee; Ho-Geon Kim; Jong-Hyun Lee, all of Daejeon, Rep. of Korea

[73] Assignees: Electronics and Telecommunications Research Institute, Daejeon; Korea Telecom, Seoul, both of Rep. of Korea

[21] Appl. No.: 08/915,257

[22] Filed: Aug. 20, 1997

[30] Foreign Application Priority Data

Dec. 12, 1996 [KR] Rep. of Korea ............ 96-64709

[51] Int. Cl.⁶ .............. G06F 13/14; G06F 13/20
[52] U.S. Cl. .......... 710/62; 710/131; 710/132; 709/218; 709/251; 370/58.1; 370/58.2
[58] Field of Search .......... 395/882, 821, 395/200.48, 200.81, 311, 312; 370/58.1, 58.2; 326/40; 710/62, 1, 131, 132; 709/218, 251

[56] References Cited

U.S. PATENT DOCUMENTS

| 5,068,877 | 11/1991 | Near et al. | 375/107 |
|---|---|---|---|
| 5,365,518 | 11/1994 | Noser | 370/58.1 |
| 5,436,890 | 7/1995 | Read et al. | 370/58.2 |
| 5,592,480 | 1/1997 | Carney et al. | 370/347 |
| 5,594,365 | 1/1997 | Agrawal et al. | 326/40 |
| 5,598,346 | 1/1997 | Arrawal et al. | 364/489 |
| 5,757,207 | 5/1998 | Lytle et al. | 326/39 |

OTHER PUBLICATIONS

Basch, B., OC–12c Digital Crossconnect Switch, IEEE, vol. 14, No. 2, Feb., 1996, pp. 346–351.
Kovac, E., The DCS as a Universal Digital Cross–Connect System, IEEE, vol. SAC–5, No. 1, Jan., 1987, pp. 53–58.
Wu, T–H., A Class of Self–Healing Ring Architectures for SONET Network Applications, IEEE, vol. 40, No. 11, Nov., 1992, pp. 1746–1756.

Primary Examiner—Thomas C. Lee
Assistant Examiner—Rehana Perveen
Attorney, Agent, or Firm—Cohen, Pontani, Lieberman & Pavane

[57] ABSTRACT

Disclosed is a synchronous cross-connect system with an integrated 2.5 Gbps (STM-16) I/O link and a ring network interworking. The synchronous cross-connect system includes: first and second I/O portions for performing I/O function with respect to a plurality of STM-16 signals, including a backplane signal pattern which takes four units among the plurality of STM-16 signals performing a protection switching and transmission functions; a signal intercrossing portion for crossing/connecting signals of the first and second I/O portions; and synchronizing portion for generating clock signals necessary to the first and second I/O portions and the signal intercrossing portion. As a result, the synchronous cross-connect system performs a transmission function without an additional apparatus in the transmission link with interoffice transmission capacity of 2.5 Gbps (STM-16), and has a high survivability because of a real-time fault recovery function using the ring network interworking.

13 Claims, 11 Drawing Sheets

SYNCHRONOUS CROSS-CONNECT SYSTEM WITH THE FUNCTION OF RING NETWORK INTERWORKING USING BACKPLANE INTERCONNECTION

BACKGROUND OF THE INVENTION

1. Field of the Invention

The present invention generally relates to a synchronous cross-connect system among a terminal multiplexer, an add-drop multiplexer and a cross-connect system in digital transmission fields. More particularly, it relates to a synchronous cross-connect system with an integrated 2.5 Gbps input/output (hereinafter referred to as I/O) link and a ring network interworking.

2. Description of the Conventional Art

In a conventional synchronous cross-connect system, synchronous signals were only flowing in an internal switch matrix, and I/O signals were mostly typical asynchronous DS-3 signals. In recent times, STM-1 signal and STM-4 signal have been used as a synchronous I/O signal. The above prior art is described in U.S. Pat. No. 5,436,890, entitled "INTEGRATED MULTI-RATE CROSS-CONNECT SYSTEM".

In a conventional system, most I/O signals are not a transmission signal between stations (hereinafter referred to as an inter-office transmission signal) but an inter-office connection signal within a station. Accordingly, an apparatus having an optical transmission function should be additionally installed to transmit the intra-office transmission signal such as STM-16, and corresponding I/O signals should be add-dropped and connected to the cross-connect system.

SUMMARY OF THE INVENTION

Accordingly, the present invention is directed a synchronous cross-connect system with an integrated 2.5 Gbps I/O link and a ring network interworking that substantially obviates one or more of the problems due to limitations and disadvantages of the conventional art.

It is an object of the present invention to provide a synchronous cross-connect system which performs a transmission without an additional inter-office transmission apparatus by including STM-16 signal being used as an inter-office transmission signal in a cross-connect system, and performs a real-time fault recovery function by using a ring network interworking.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the above object, a synchronous cross-connect system according to the present invention includes: first and second I/O means for performing I/O function with respect to a plurality of STM-16 signals; signal intercrossing means for crossing/connecting signals of the first and second I/O means; and synchronizing means for generating a synchronizing signal necessary to the first and second I/O means and the signal intercrossing means.

Preferably, the first and second I/O means include:
a plurality of synchronous I/O portions which comprise a pair of working/protection, and have six pairs of working/protection containing STM-16 bidirectional transmission signals; and a signal connection portion which transmits signals of the synchronous I/O portions to the signal intercrossing means, and includes a backplane signal pattern which takes four I/O portions making a pair of working/protection as a unit.

The aforementioned present invention receives an I/O signal by one synchronizing I/O portion as an input, and transports the signal to another synchronizing I/O portion via the signal intercrossing means. If there is a failure in either one synchronizing I/O portion or another synchronizing I/O portion during transporting the signal, the present invention is switched to operate a protection synchronizing I/O portion making a pair with a failed working synchronizing I/O portion by the signal pattern.

The present invention performs a transmission function without an additional apparatus in an interval of inter-office transmission capacity of 2.5 Gbps (STM-16). Accordingly, the present invention is economical and effective in the aspect of the size thereof, and has a high survivability because of a real-time recovery function.

It is to be understood that both the foregoing general description and the following detailed description are exemplary and explanatory and are intended to provide further explanation of the invention as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The preferred embodiment of the present invention will become apparent from a study of the following detailed description, when viewed in light of the accompanying drawings.

Figure 1A:
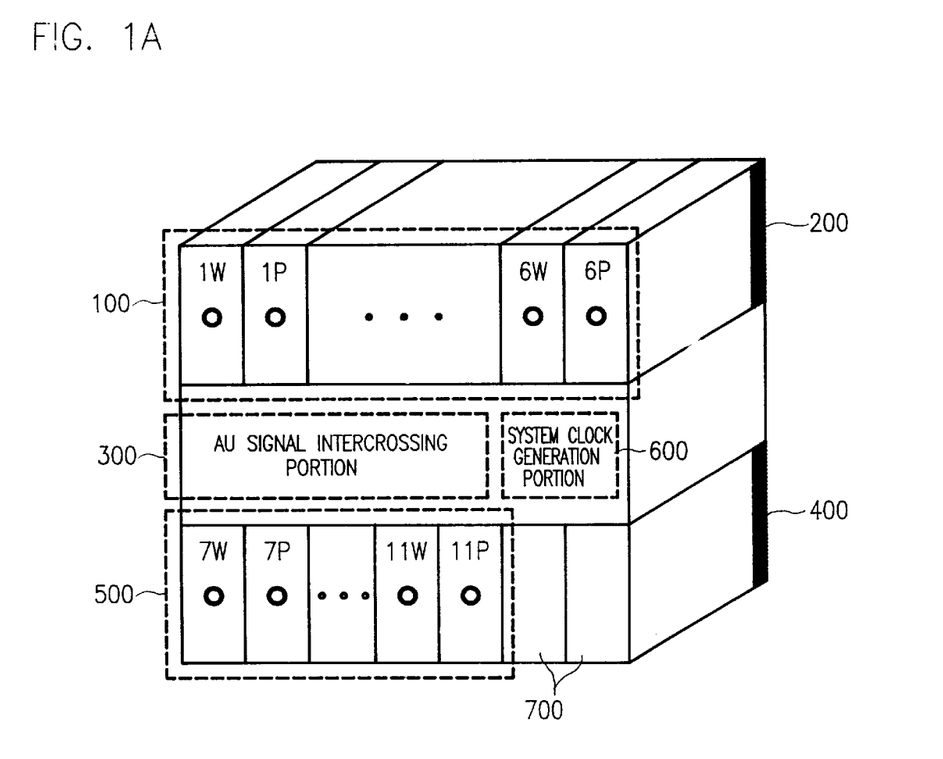
FIG. 1A shows a synchronous cross-connect system with an integrated 2.5 Gbps I/O link and a ring network interworking in accordance with the present invention.
Figure 1B:
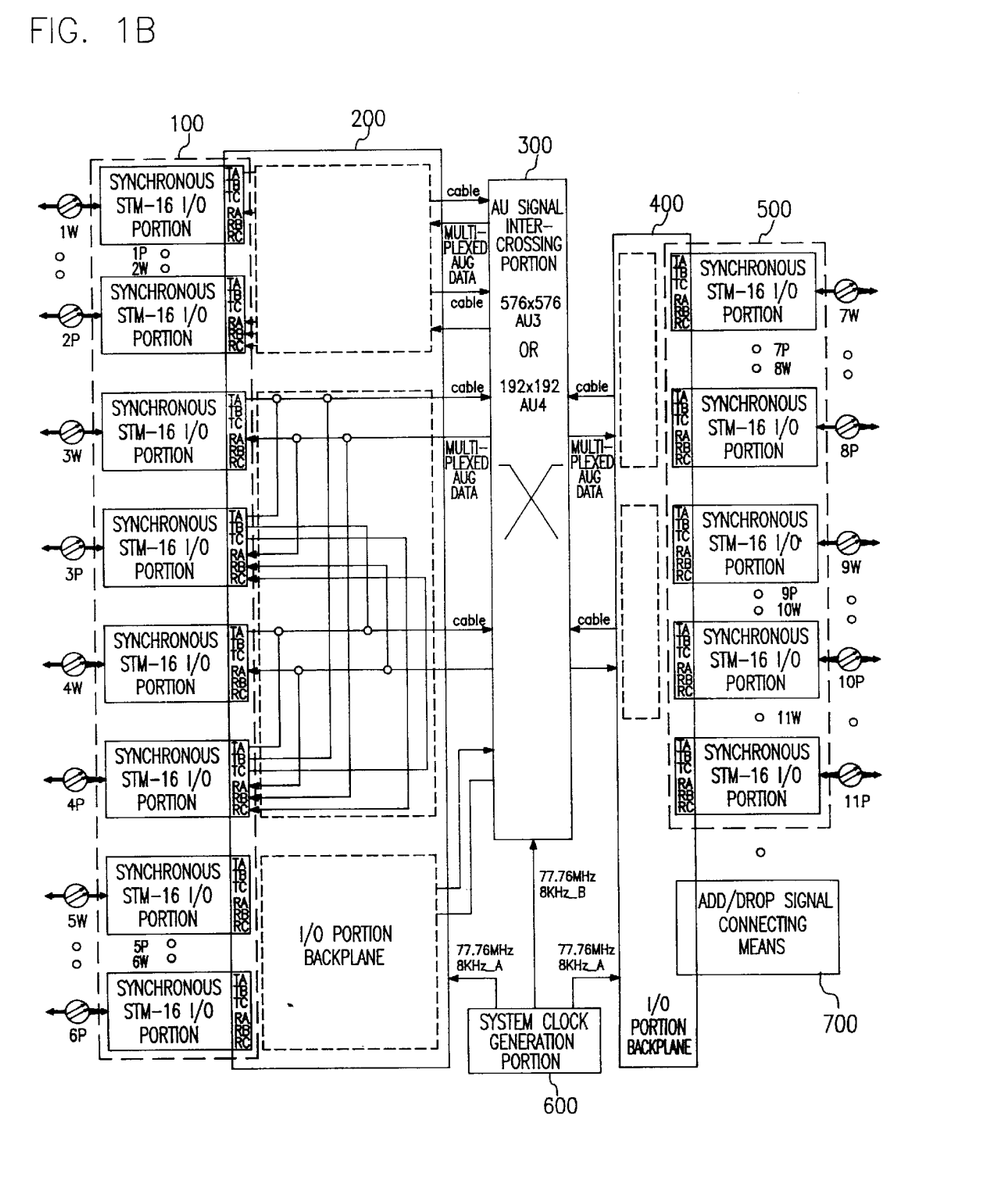
FIG. 1B shows a signal connection of a synchronous cross-connect system with an integrated 2.5 Gbps I/O link and a ring network interworking in accordance with the present invention.

FIG. 1A shows a synchronous cross-connect system with an integrated 2.5 Gbps I/O link and a ring network interworking in accordance with the present invention; and FIG. 1B shows a signal connection in a synchronous cross-connect system with an integrated 2.5 Gbps I/O link and a ring network interworking in accordance with the present invention.

Referring to FIG. 1A, a synchronous cross-connect system according to the present invention includes:

two sub-racks which mount a plurality of synchronous STM-16 I/O portions 100 and 500 to I/O portion backplanes 200 and 400; and one sub-rack which includes AU signal intercrossing portion 300 and a system clock generation portion 600 between the two sub-racks.

The upper I/O sub-rack includes: twelve synchronous STM-16 I/O portions 100 which make six pairs of working/protection to include twelve STM-16 bidirectional transmission signals; and I/O portion backplane 200 including the twelve synchronous STM-16 I/O portions 100.

The lower I/O sub-rack includes: ten synchronous STM-16 I/O portions 500 which make five pairs of working/protection to include ten STM-16 bidirectional transmission signals; and I/O portion backplane 400 including the ten synchronous STM-16 I/O portions 500 and an add/drop signal connecting means 700.

The sub-rack between the upper and lower sub-racks includes: AU signal intercrossing portion 300; and a system clock generation portion 600 for outputting a clock signal to the I/O portion backplanes 200 and 400 and the AU signal intercrossing portion 300.

Referring to FIG. 1B, a synchronous cross-connect system according to the present invention includes twenty-two STM-16 bidirectional transmission signals. The plurality of synchronous STM-16 I/O portions 100 and 500 respectively include three transmission ports TA, TB and TC and three receiving ports RA, RB and RC.

At this time, the I/O portion backplane 200 of the upper sub-rack include three backplane signal patterns by using four STM-16 I/O units, (i.e., (1W, 1P, 2W and 2P), (3W, 3P, 4W and 4P) or (5W, 5P, 6W and 6P)).

The I/O portion backplane 400 of the lower sub-rack includes two backplane signal patterns by using four STM-16 I/O units, (i.e., (7W, 7P, 8W and 8P)or (9W, 9P, 10W and 10P). The above signal patterns perform the same function.

The synchronous STM-16 I/O portions 100 and 500 receive STM-16 signals, and perform an optical-to-electrical conversion, process a framing, section, and line overhead of STM-16 signal by using a recovered clock of 2488.02 MHz. Then an internal pointer processor interprets a receiving pointer value, and arranges all channels phases via a pointer generator in order to facilitate an intercrossing between AU signals in the intercrossing portion 300.

At this point, in order to include a ring network function, multiplexed AUG signals are connected between adjacent four STM-16 signal I/O portions, a bypass signal is real-time processed via the I/O portion backplane 200 or 400, and add/drop signals are connected via AU signal intercrossing portion 300.

In the synchronous STM-16 I/O portion 100 or 500, four units are operated as one group. The synchronous STM-16 portions function as a bidirectional line switched ring using four fibers (hereinafter referred to as a BLS4F), function as a bidirectional line switched ring using two fibers (hereinafter referred to as a BLS2F), and also function as a unidirectional path switched ring (hereinafter referred to as a UPS).

Patterns connected to units 3W, 3P, 4W and 4P, of synchronous STM-16 I/O portions on the I/O portion backplane 200 shown in FIG. 1B are commonly applied to the units (1W,1P,2W and 2P), (5W,5P,6W and 6P), (7W,7P,8W and 8P) and (9W,9P,10W and 10P).

In AU signal intercrossing portion 300 receiving the multiplexed AUG data, 192×192 AU-4 path signals or 576×576 AU-3 path signals in the multiplexed AUG signals are cross-connected, and the multiplexed AUG data are reformed and transmitted the signal to the corresponding I/O portion.

At this time, timing signals needed to each I/O portion 100 or 500 and the intercrossing portion 300 (i.e., the timing signals are a basic clock signal 77.76 MHz and a reference clock signal 8 KHZ) are provided from a system clock generation portion 600.

Figure 2A:
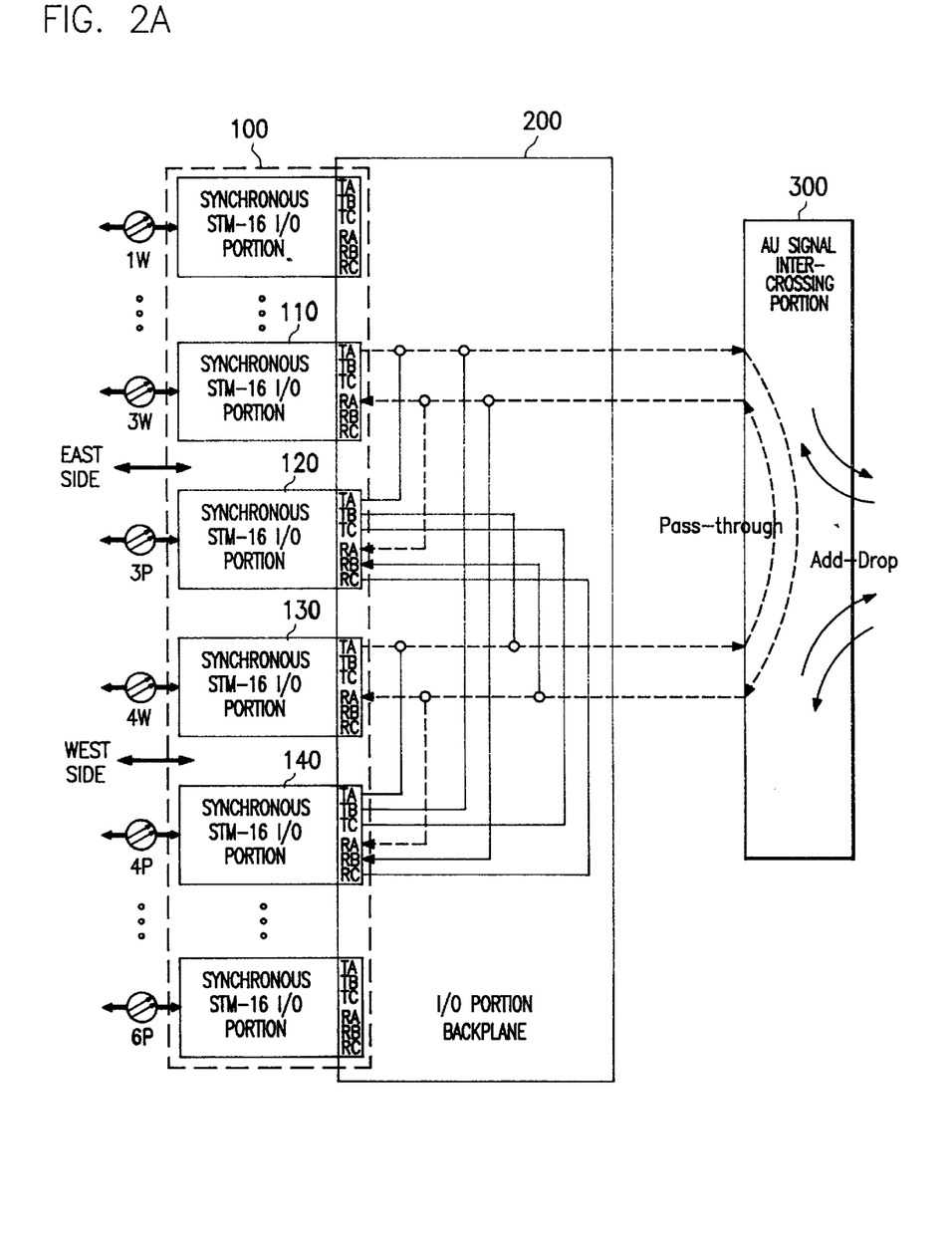
FIG. 2A shows a backplane signal construction and its operation in comprising a bidirectional line switched ring using four optical fibers at a normal state in accordance with the present invention.
Figure 2B:
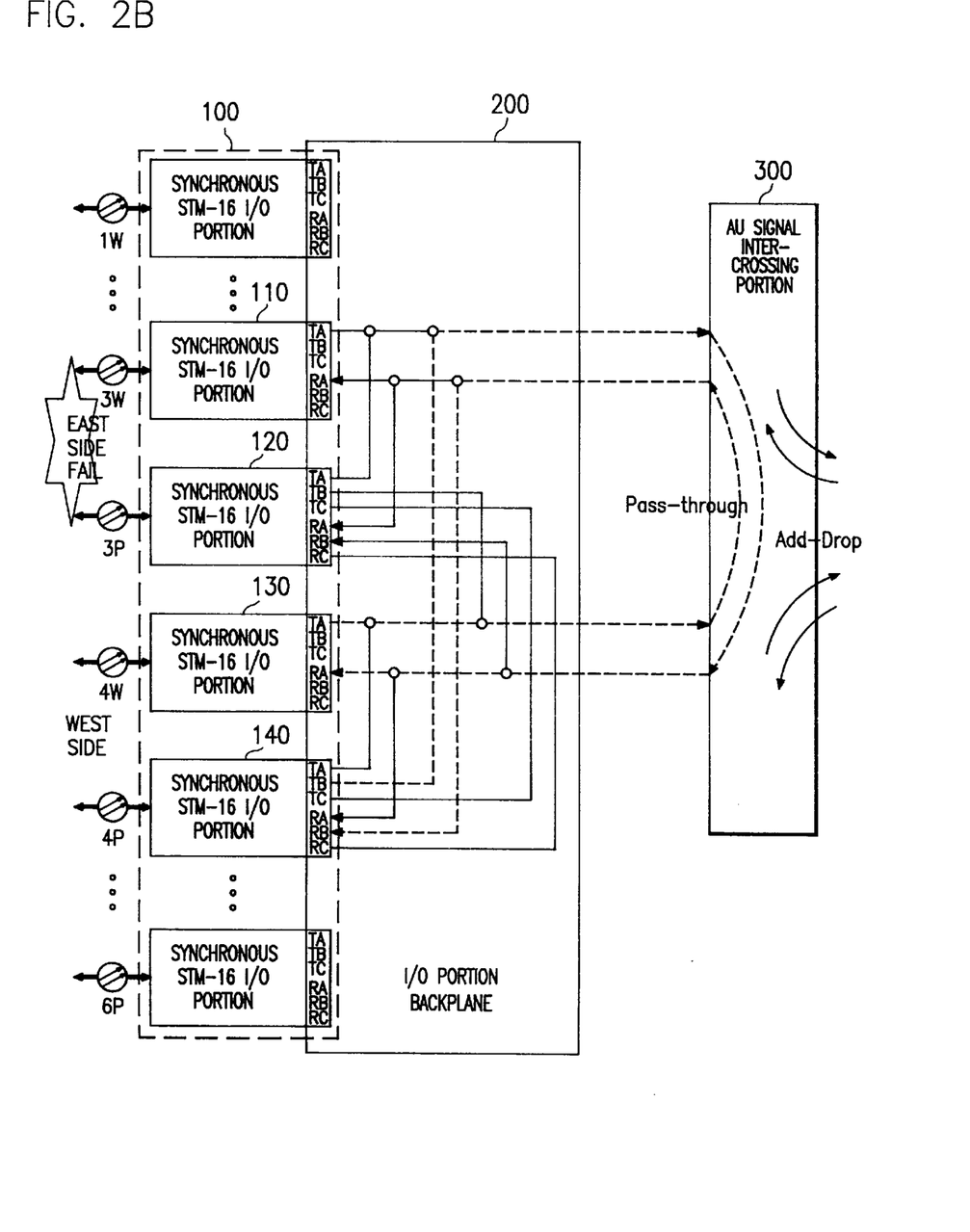
FIG. 2B shows a backplane signal construction and its operation in comprising a bidirectional line switched ring using four optical fibers at EAST side failure state in accordance with the present invention.
Figure 2C:
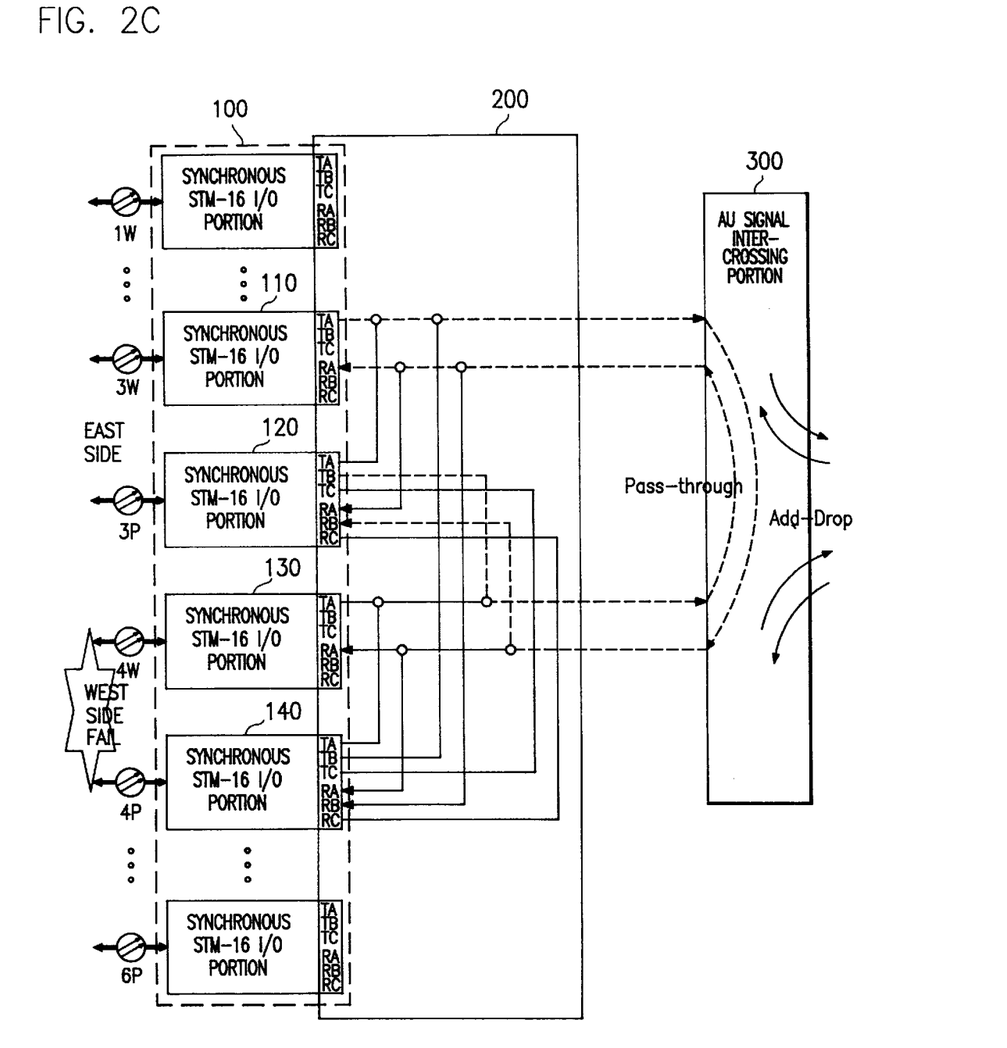
FIG. 2C shows a backplane signal construction and its operation in comprising a bidirectional line switched ring using four optical fibers at WEST side failure state in accordance with the present invention.
Figure 2D:
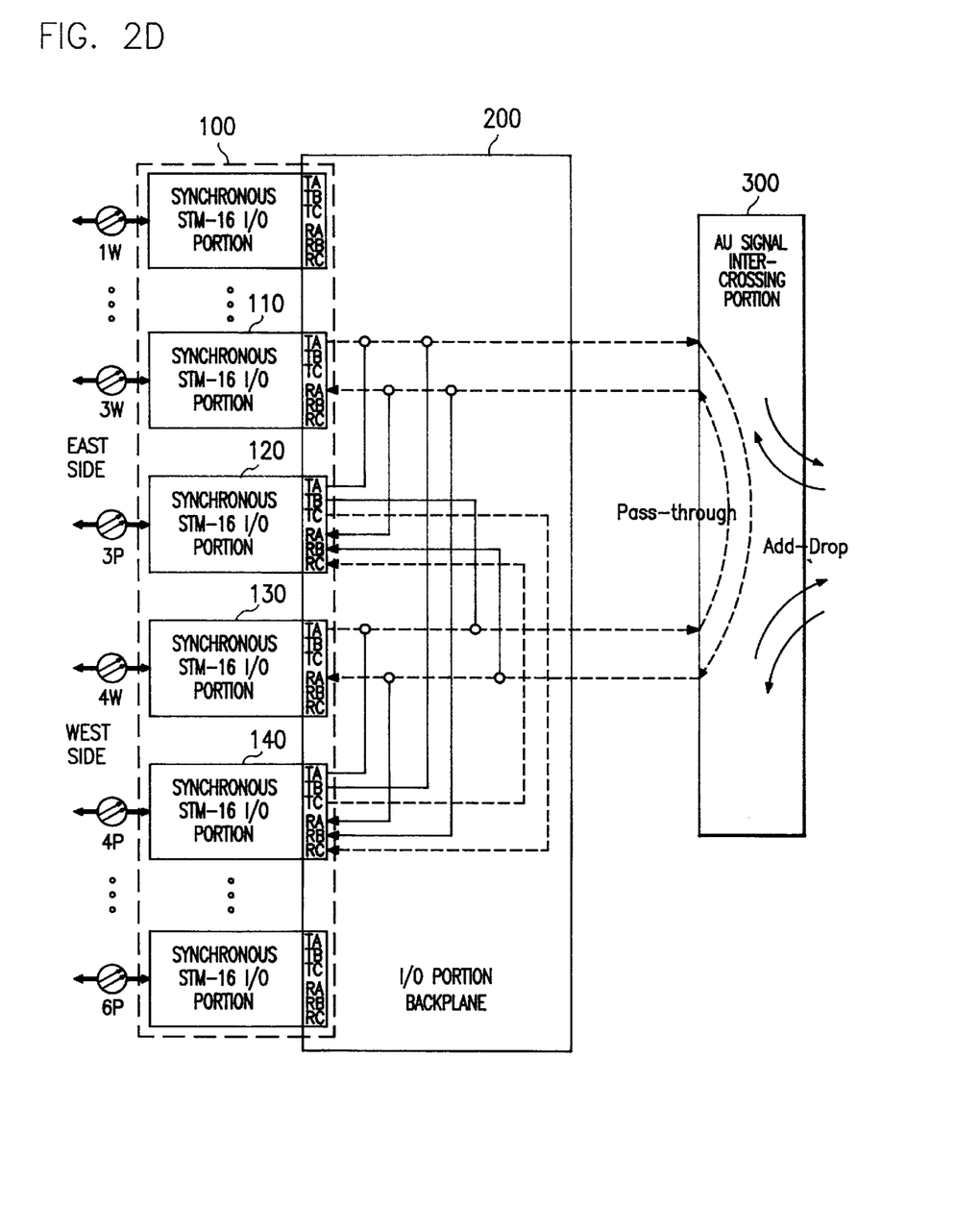
FIG. 2D shows a backplane signal construction and its operation in comprising a bidirectional line switched ring using four optical fibers at the intermediate node in the failure state in accordance with the present invention.

FIGS. 2A to 2D show a backplane signal construction and its operation in comprising a bidirectional line switched ring using four optical fibers; FIG. 2A shows a backplane signal construction and its operation in comprising a bidirectional line switched ring using four optical fibers at a normal state; FIG. 2B shows a backplane signal construction and its operation in comprising a bidirectional line switched ring using four optical fibers at the EAST side failure state; FIG. 2C shows a backplane signal construction and its operation in comprising a bidirectional line switched ring using four optical fibers at the WEST side failure state; and FIG. 2D shows a backplane signal construction and its operation in comprising a bidirectional line switched ring using four optical fibers at the intermediate node in the failure state.

In operation of a normal state, a signal via one transmission port TA of one working I/O portion among a plurality of I/O portions making a pair of working/protection, passes through the signal intercrossing means, and is branched and transmitted to a receiving portion RA of the other working/protection I/O portions among the plurality of I/O portions.

A signal via one transmission port TA of another working I/O portion passes through the signal intercrossing means, and is branched and transmitted to the receiving ports RA of one working I/O portion and one protection I/O portion.

Referring to FIG. 2A, in order to form BLS4/F network, two synchronous STM-16 I/O portions are installed to each side of WEST and EAST, respectively, thus four STM-16 signal I/O portions 110, 120, 130 and 140 are installed in total. In a normal state, the transmitting/receiving STM-16 signal of the each side is selected as an operating signal in working I/O portions 110 and 130.

At this time, signals of the ports TA of the working/protection (hereinafter referred to as W/P) I/O portions 130 and 140 are enabled in the working I/O portion 130, are disabled in the protection I/O portion 140, and thus have Wired-OR format on the backplane.

The receiving STM-16 signal of WEST side passing through AU signal intercrossing portion 300, is bridged towards RA ports of EAST side W/P I/O portions 110 and 120, and are transmitted to the RA ports of I/O portions 110 and 120.

The transmitting/receiving STM-16 signal of EAST side is selected as an operating signal in the working I/O portion 110. The STM-16 signal transmitted toward WEST side is bridged towards RA ports of W/P I/O portions 130 and 140, and is transmitted to the RA ports of the I/O portions 130 and 140. In this case, a dotted line designates a signal transmission route.

When bidirectional line switched ring using four optical fibers is formed in EAST side failure state, a signal from WEST side to EAST side is transmitted to one receiving port RB of a protection I/O portion of WEST side, because a signal via each transmission port TA of WEST side working I/O portion and WEST side protection I/O portion is selected on the backplane, passes through the signal intercrossing means, and can not be transmitted owing to EAST side's failure on the way to going toward one I/O portion connected to EAST side.

Due to EAST side's failure, a signal is not used in a transmission from EAST to WEST. Thus EAST side signal before the failure is inputted via another transmission port TB of a protection I/O portion of WEST side. The signal of the transmission port TB substitutes for a backplane signal connection from the EAST side to the signal intercrossing means, passes through the signal intercrossing means, is branched to a receiving port RA of the WEST side working I/O portion, and is transmitted to the receiving port RA of the WEST side working I/O portion.

Referring to FIG. 2B, ports TA, TB and TC of W/P I/O portions 110 and 120 of the synchronous STM-16 I/O portions at EAST side failure state are totally disabled. A transmitting/receiving STM-16 signals in the working I/O portion 130 maintain a typical setting operated in WEST side before the EAST side failure generation. EAST side signal having a failure is connected to the intercrossing portion 300 on the backplane through TB channel of the protection I/O portion 140 of WEST side. Herein, TB channel is the same as a signal transmitted to TA channel of the working I/O portion 110 of EAST side before the failure, its connection is also the same as this signal.

STM-16 signal outputted to EAST side before the failure should set an input signal from the intercrossing portion via RB port of WEST side protection I/O portion 140, simultaneously with maintaining the typical setting. Herein, RB port is the same as a signal received from RA ports of EAST sides 110 and 120, and its connection is also the same as this signal. At this time, a dotted line designates a signal transmission route.

When bidirectional line switched ring using four optical fibers is formed in WEST side failure state, a signal is not used in a transmission from WEST side to EAST side due to WEST side's failure. Thus WEST side signal before the failure is inputted via one transmission port TB of a preparing I/O portion of EAST side.

The signal of the transmission port TB substitutes for a backplane signal connection from the WEST side to the signal intercrossing means, passes through the signal intercrossing means, is branched to a receiving port RA of the EAST side working I/O portion, and is transmitted to the receiving port RA of the EAST side working I/O portion.

A signal from WEST side to EAST side is switched and transmitted to another receiving port RB of a protection I/O portion of EAST side, because a signal via one transmission port TA of EAST side working I/O portion passes through the signal intercrossing means, and can not be transmitted due to WEST side failure on the way to going toward one I/O portion connected from the signal intercrossing means to WEST side.

Referring to FIG. 2C, ports TA, TB and TC of the W/P I/O portions 130 and 140 of the synchronous STM-16 I/O portions in WEST side failure state are totally disabled. A transmitting/receiving STM-16 signals in the working I/O portion 110 maintain a typical setting operated in EAST side before the WEST side failure generation. WEST side signal having a failure is connected to the intercrossing portion 300 on the backplane via TB channel of the protection I/O portion 120 of EAST side. Herein, TB channel is the same as a signal transmitted to TA channel of the working I/O portion 130 of WEST side before the failure, its connection is also the same as this signal.

STM-16 signal outputted to WEST side before the failure should set an input signal from the intercrossing portion via RB port of EAST side protection I/O portion 120, simultaneously with maintaining the typical setting. Herein, RB port is the same as a signal received from RA ports of WEST sides 130 and 140, and its connection is also the same as this signal. At this time, a dotted line designates a signal transmission route.

When bidirectional line switched ring using four optical fibers is formed at the intermediate node in a failure state, as to a signal transmission from WEST side to EAST side, a signal via one transmission port TA of WEST side working I/O portion passes through the signal intercrossing means, is branched to a receiving port RA of EAST side working I/O portion, and is transmitted to the receiving port RA of EAST side working I/O portion. In addition, the transmission port TC signal of the WEST side protection I/O portion is transmitted to one receiving port RC of EAST side protection I/O portion directly.

As to a signal transmission from EAST side to WEST side, a signal via one transmission port TA of EAST side working I/O portion passes through the signal intercrossing means, is branched to a receiving port RA of WEST side working I/O portion, and is transmitted to the receiving port RA of WEST side working I/O portion. In addition, the transmission port TC signal of the EAST side protection I/O portion is transmitted to one receiving port RC of WEST side protection I/O portion directly.

Referring to FIG. 2D, as to a through state at the intermediate node in the failure state, TC port of WEST side protection I/O portion 140 is connected to RC port of EAST side protection I/O portion 120, and TC port of EAST side protection I/O portion 120 is connected to RC port of WEST side protection I/O portion 140. At this time, a dotted line designates a signal transmission route.

Figure 3A:
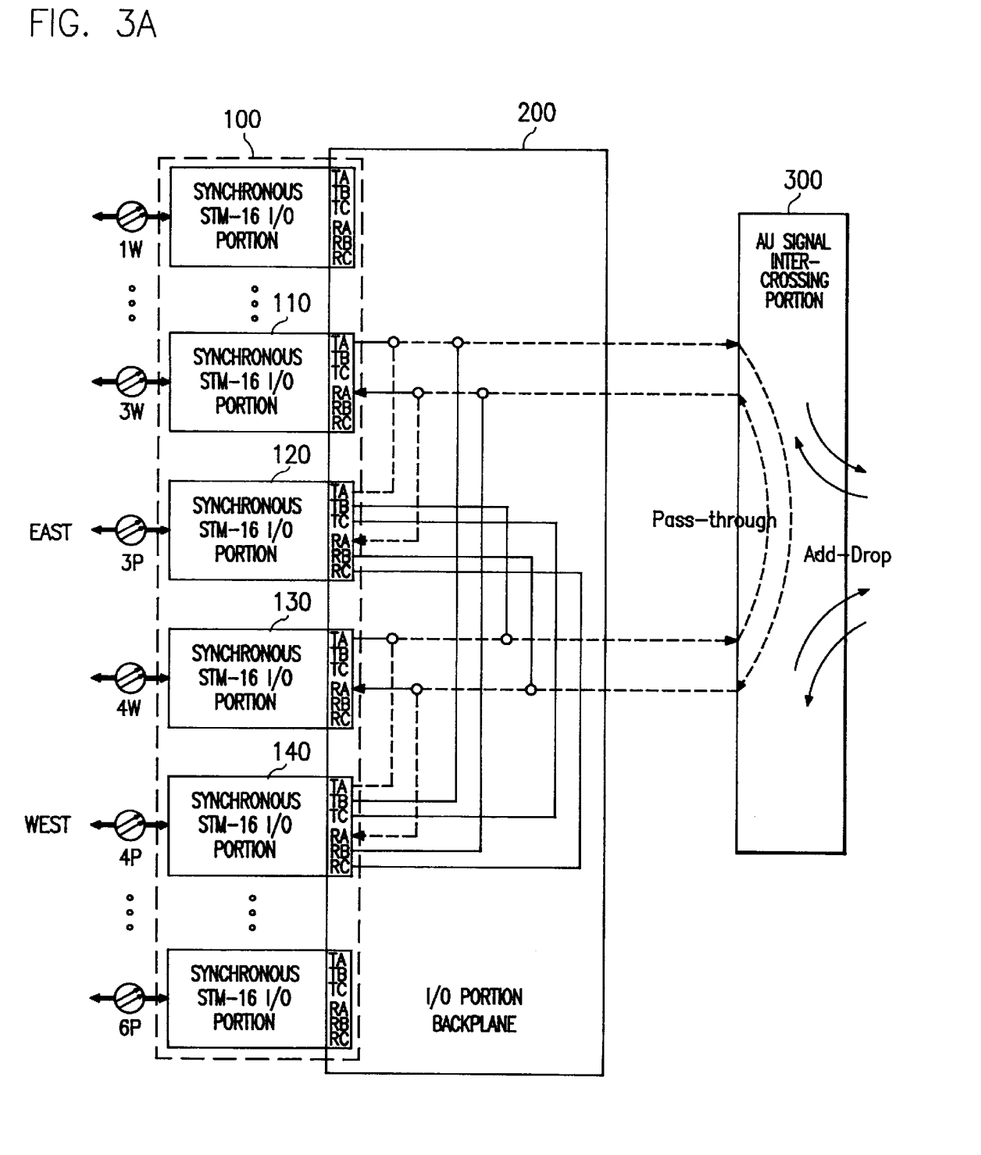
FIG. 3A shows a backplane signal construction and its operation in comprising a bidirectional line switched ring using two optical fibers at a normal state in accordance with the present invention.
Figure 3B:
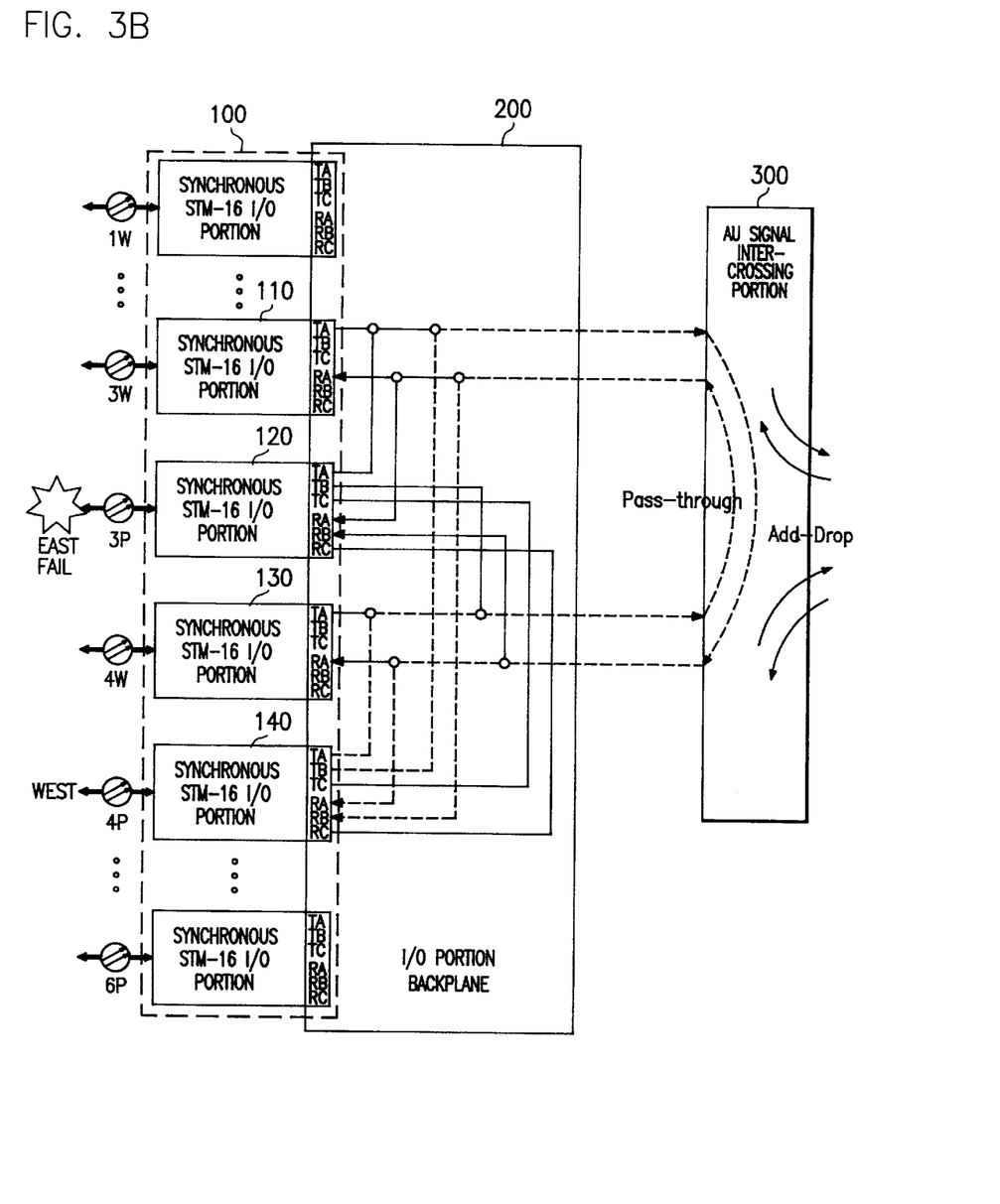
FIG. 3B shows a backplane signal construction and its operation in comprising a bidirectional line switched ring using two optical fibers at EAST side failure state in accordance with the present invention.
Figure 3C:
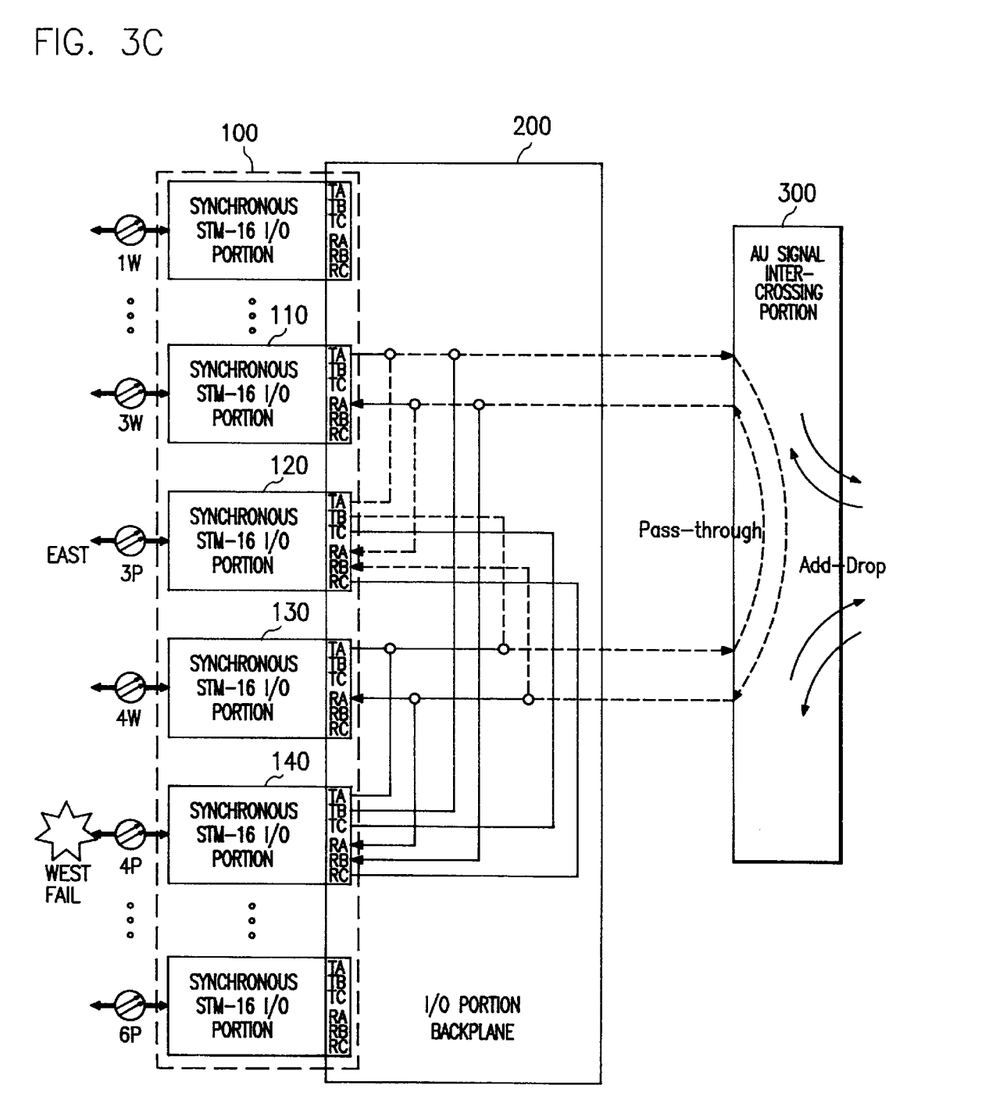
FIG. 3C shows a backplane signal construction and its operation in comprising a bidirectional line switched ring using two optical fibers at WEST side failure state in accordance with the present invention.

FIGS. 3A to 3C show a backplane signal construction and its operation in comprising a bidirectional line switched ring using two optical fibers; FIG. 3A shows a backplane signal construction and its operation in comprising a bidirectional line switched ring using two optical fibers at a normal state; FIG. 3B shows a backplane signal construction and its operation in comprising a bidirectional line switched ring using two optical fibers at the EAST side failure state; and FIG. 3C shows a backplane signal construction and its operation in comprising a bidirectional line switched ring using two optical fibers at the WEST side failure state.

When comprising a bidirectional line switched ring using two optical fibers in a normal state, a signal via a transmission port TA of one preparing I/O portion among a plurality of I/O portions making a pair of working/protection passes through the signal intercrossing portion, and is transmitted to a receiving port RA of another protection I/O portion among the plurality of I/O portions.

Referring to FIG. 3A, in order to form BLS2/F network, two synchronous STM-16 I/O portions 120 and 140 should be installed at positions 3P and 4P being protection slots in WEST and EAST sides.

In a normal state, a working signal is included into 1st to 24th AU 3 channels among the transmitting/receiving STM-16 signals of the I/O portion 140 of WEST side, the remaining 25th to 48th AU 3 channels are used as a protection channel or as a pass-through channel. In addition, a working signal is included into 1st to 24th AU 3 channels among the transmitting/receiving STM-16 signals of the I/O portion 120 of EAST side, the remaining 25th to 48th AU 3 channels are used as a protection channel or as a pass-through channel. In order to determine the channels as a pass-through channel, 25th to 48th channels of WEST side are cross-connected with 25th to 48th channels of EAST side in the 1:1 ratio. At this time, a dotted line designates a signal transmission route.

When bidirectional line switched ring using two optical fibers is formed in EAST side failure state, a signal from WEST side to EAST side is transmitted to one receiving port RB of a protection I/O portion of WEST side, because a signal via one transmission port TA of one protection I/O portion of WEST side passes through the signal intercrossing means, and can not be transmitted due to EAST side failure on the way to going toward one protection I/O portion connected to EAST side.

Due to EAST side's failure, the signal is not used in a transmission from EAST side to WEST side. Thus EAST side signal before the failure is inputted via another transmission port TB of a protection I/O portion of WEST side. The signal of the transmission port TB substitutes for a backplane signal connected from the EAST side to the signal intercrossing means, passes through the signal intercrossing means, and is transmitted to another receiving port RA of the WEST side protection I/O portion.

Referring to FIG. 3B, channels received in EAST side 120 could not be used in EAST side 120's failure state, so the signal received into WEST side 140 should be used. The 1st to 24th channels among the receiving STM-16 signals of WEST side 140 are transmitted to TA port, simultaneously with maintaining a typical setting operated in the WEST side 140. The remaining 24th to 48th channels of WEST side 140 are used as a protection channel, and use TB port. Herein, signals of 25th to 48th channels of WEST side 140 should be identical with those of the 1st to 24th channels of EAST side 120 at the normal state, and should have the same crossing structure as the 1st to 24th channels of EAST side 120.

In order to form STM-16 signal outputted to WEST side 140, the 1st to 24th channels should be transmitted to RA port simultaneously with maintaining a typical setting, and the 25th to 48th channels should set a signal transmission from the intercrossing portion 300 to RB port. Herein, signals of 25th to 48th channels should be identical with those of the 1st to 24th channels of EAST side 120 at the normal state, and should have the same crossing structure as the 1st to 24th channels of EAST side 120. At this point, the dotted line designates a signal transmission route.

When bidirectional line switched ring using two optical fibers is formed in WEST side failure state, a signal from EAST side to WEST side is transmitted to one receiving port RB of a protection I/O portion of EAST side, because a signal via one transmission port TA of one protection I/O portion of EAST side passes through the signal intercrossing means, and can not be transmitted due to WEST side failure on the way to going toward one protection I/O portion connected to WEST side.

Due to WEST side's failure, the signal is not used in a transmission from WEST side to EAST side. Thus WEST side signal before the failure is inputted via another transmission port TB of a protection I/O portion of EAST side. The signal of the transmission port TB substitutes for a backplane signal connected from the WEST side to the signal intercrossing means, passes through the signal intercrossing means, and is transmitted to another receiving port RA of the EAST side protection I/O portion.

Referring to FIG. 3C, channels received in WEST side could not be used in WEST side failure state, so the signal received into EAST side should be used. The 1st to 24th channels among the receiving STM-16 signals of EAST side are transmitted to TA port, simultaneously with maintaining a typical setting operated in the EAST side. The remaining 24th to 48th channels of EAST side are used as a protection channel, and use TB port. Herein, signals of 25th to 48th channels of EAST side should be identical with those of the 1st to 24th channels of WEST side at the normal state, and should have the same crossing structure as the 1st to 24th channels of WEST side.

In order to form STM-16 signal outputted to EAST side, the 1st to 24th channels should be transmitted to RA port simultaneously with maintaining a typical setting, and the 25th to 48th channels should set a signal transmission from the intercrossing portion 300 to RB port. Herein, signals of 25th to 48th channels should be identical with those of the 1st to 24th channels of WEST side at the normal state, and should have the same crossing structure as the 1st to 24th channels of WEST side. At this point, the dotted line designates a signal transmission route.

When comprising bidirectional line switched ring using two optical fibers at the intermediate node in the failure state, the same operation as the normal state is performed in a backplane signal construction and its operation.

Figure 4:
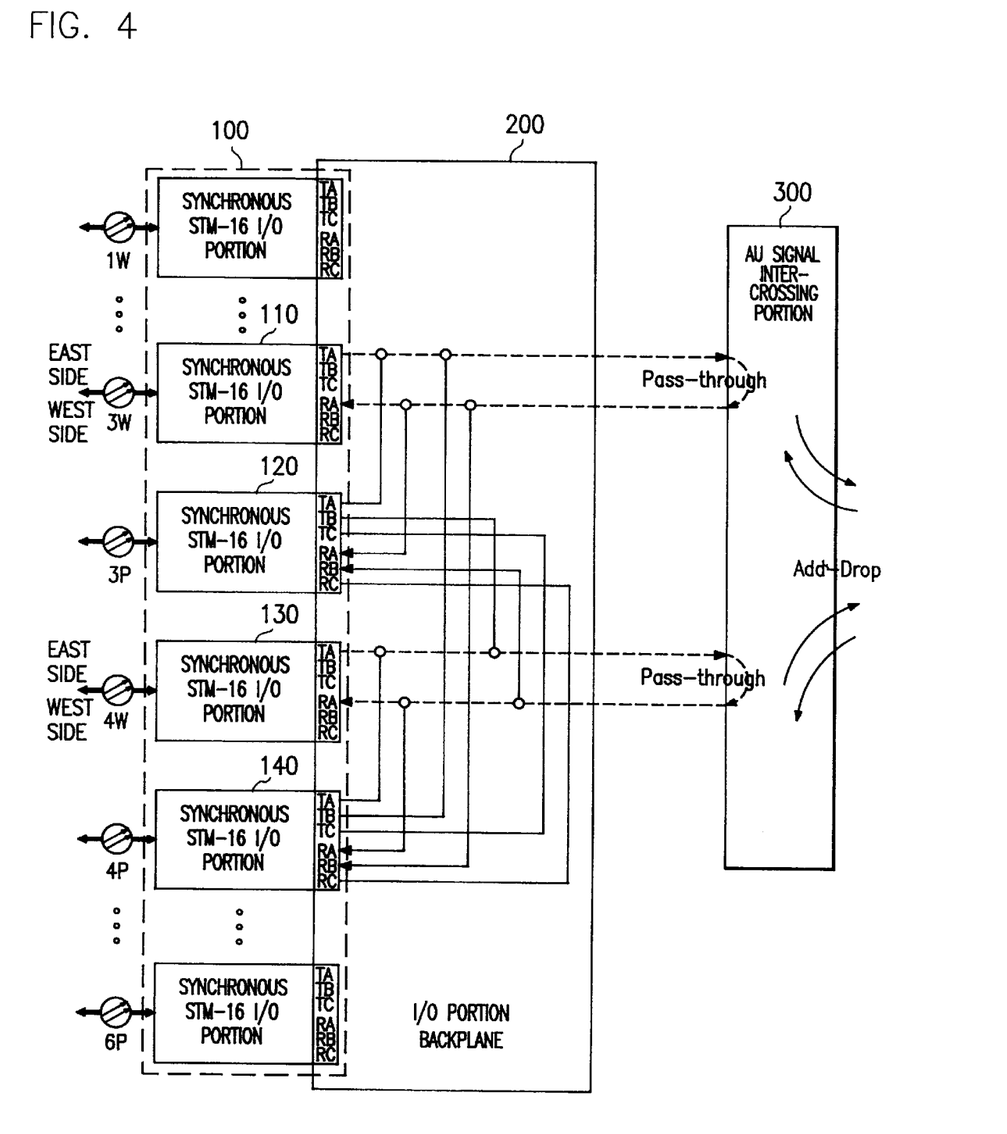
FIG. 4 shows a backplane signal construction in comprising a unidirectional path switched ring (hereinafter referred to as a UPSR) in accordance with the present invention.
Figure 5:
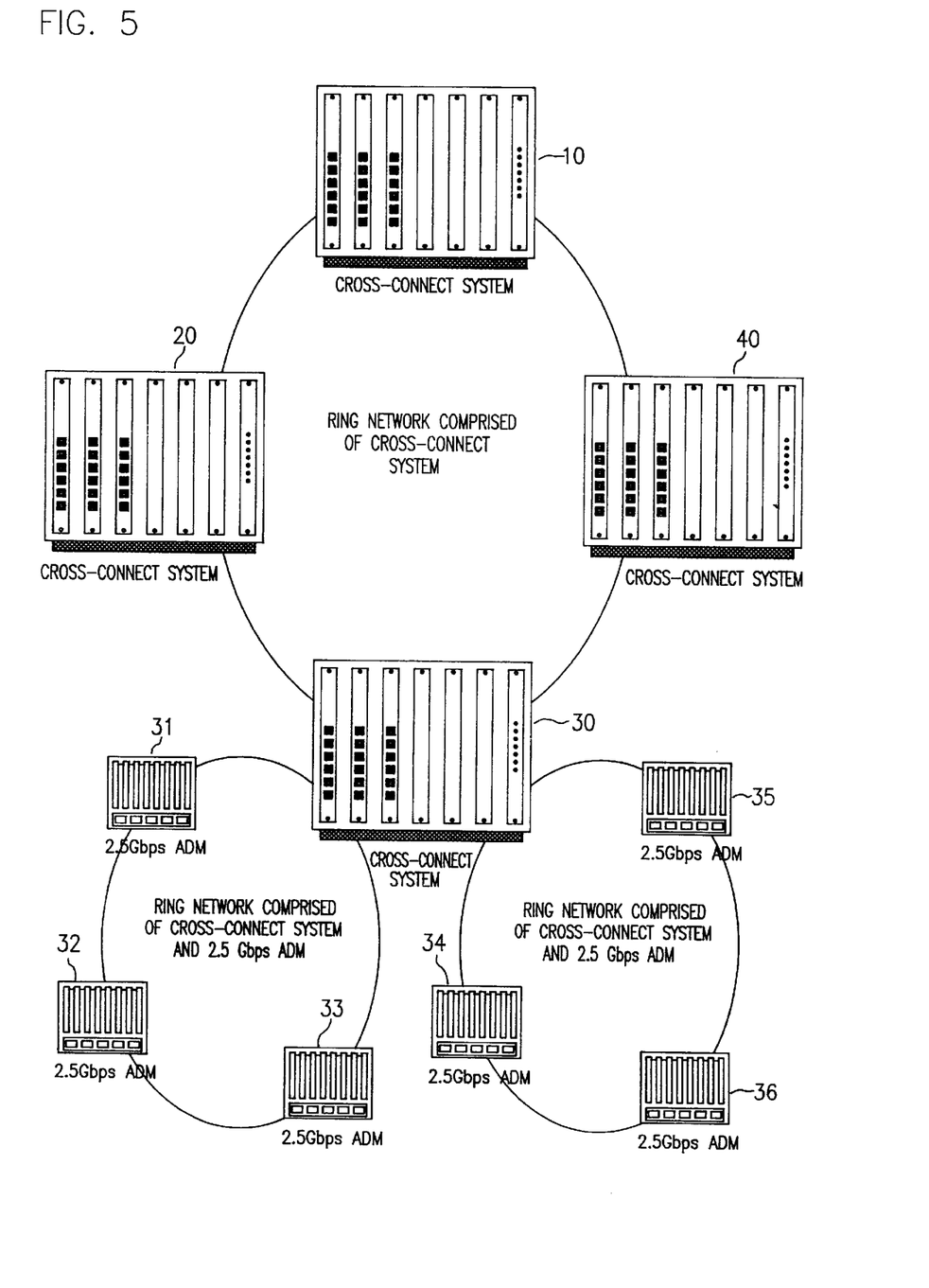
FIG. 5 shows a ring network construction using a cross-connect system in accordance with the present invention.

FIG. 4 shows a backplane signal construction in comprising a unidirectional path switched ring (UPSR); and FIG. 5 shows a ring network construction using a cross-connect system according to the present invention.

In order to form UPS network in a normal state, the operational I/O portion is installed to each of WEST and EAST sides. STM-16 signal received into the operational I/O portion 110 making an operational ring is used in a normal state, and another STM-16 signal received into the operational I/O portion 130 making a protection ring in the operational ring's failure state. As a setting for a pass-through, one to one distribution should be set.

Referring to FIG. 5, the cross-connect system according to the present invention can include maximally five ring networks per one system. The cross-connect system can perform the interworking function between ring network comprised of cross-connect systems (10, 20, 30 and 40) and ring networks comprised of 2.5 Gbps ADMs (31, 32 and 33) and (34, 35 and 36), and can also perform an inherent function of each ring.

As described above, the cross-connect system according to the present invention makes the same connection relation in the multiplexed parallel AUG data inputted to a plurality of synchronous I/O portions, thereby providing a versatile function. The cross-connect system processes the connected signal in parallel, thereby providing a stable system having a speed lower than 80 MHz. Since the cross-connect system directly performs an optical transmission function without an additional apparatus in an interval of interoffice transmission capacity of 2.5 Gbps, the cross-connect system according to the present invention is economical and effective in the aspect of the size of the system. The present invention has a high survivability by making an inherent alternate route of the cross-connect system, and includes ring networks (BLSR4FG, BLSR2F and UPSR) having a real-time fault recovery function.

Furthermore, the present invention can includes an interworking function between ring networks in a connection of the multiple rings, thereby enhancing a flexibility of network.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A synchronous cross-connect system with an integrated 2.5 Gbps STM-16 input/output link and a ring network interworking, comprising:

first means for inputting/outputting a plurality of STM-16 signals;

second means for inputting/outputting a plurality of STM-16 signals;

signal intercrossing means for crossing/connecting signals between said first and second input/output means; and synchronizing means for generating clock signals to said first and second input/output means and said signal intercrossing means;

wherein said first input/output means comprises twelve synchronous input/output portions, each input/output portion having a plurality of transmitting and receiving ports, said input/output portions forming six working/protection pairs and having six pairs of STM-16 bidirectional transmission signals, and a signal connection portion for transmitting signals output from said synchronous input/output portions to said signal intercrossing means, said signal connection portion including three backplane signal patterns, each backplane signal pattern comprising four of the input/output portions of two working/protection pairs, wherein said second input/output means comprises ten synchronous input/output portions, each input/output portion having a plurality of transmitting and receiving ports, forming five working/protection pairs and having five pairs of STM-16 bidirectional transmission signals, a signal connection portion for transmitting signals of the synchronous input/output portions to said signal intercrossing means, and a signal add/drop portion connected to said signal connection portion for performing an add/drop signal connecting function, wherein, said second signal connection portion includes two backplane signal patterns, each backplane signal pattern comprising four of the synchronous input/output portions of two working/protection pairs.

2. The system in accordance with claim 18, wherein said signal connection portion comprises a bidirectional line switched ring using four optical fibers, said signal connection portion being constructed so that one transmission port of a first working input/output portion among the input/output portions forming a working/protection pair is connected by way of said signal intercrossing means to receiving ports of a second working/protection pair from among the input/output portions, and one transmission port of the second working input/output portion is connected by way of said signal intercrossing means to the receiving ports of the first working input/output portion and the first protection input/output portion.

3. The system in accordance with claim 18, wherein said signal connection portion comprises a bidirectional line switched ring using four optical fibers formed at one side in a failure state, said signal connection portion being constructed so that one receiving port of a working input/output portion of the failure side is connected to another receiving port of a protection input/output portion of the non-failure side, in order to transmit signals from the non-failure side to the failure side; and, said signal connection portion being constructed so that a second transmission port of a protection input/output portion of the non-failure side is substituted for a backplane signal connection from the failure side and connected by way of said intercrossing means to second receiving ports of the non-failure side working input/output portion and the non-failure side protection input/output portion, in order to transmit a signal from the failure side to the non-failure side.

4. The system in accordance with claim 18, said signal connection portion comprising a bidirectional line switched ring using four optical fibers formed at an intermediate node in a failure state, said signal connection portion being constructed so that one transmission port of a working input/output portion of a first side is connected by way of said signal intercrossing means to each of the receiving ports of the protection input/output portion and the working input/output portion of a second side, and one transmission port of a protection input/output portion of the second side is connected to a receiving port of the protection input/output portion the first side, in order to transmit a signal from the first side to the second side; and, said signal connection portion being constructed so that one transmission port of the working input/output portion of the second side is connected by way of said signal intercrossing means to each of the receiving ports of the working input/output portion and the protection input/output portion of the second side, and one transmission port of a protection input/output portion of the first side is connected to a receiving port of the protection input/output portion of the second side.

5. The system in accordance with claim 18, wherein said signal connection portion comprises a bidirectional line switched ring using two optical fibers, said signal connection portion being constructed so that one transmission port of a first protection input/output portion among the input/output portions forming a working/protection pair is connected way of said signal intercrossing means to a receiving port of a second protection input/output portion from among the input/output portions forming a working/protection pair, and one transmission port of the second working input/output portion is connected by way of said signal intercrossing means to a receiving port of the first protection input/output portion.

6. The system in accordance with claim 18, wherein said signal connection portion comprises a bidirectional line switched ring using two optical fibers formed at one side in a failure state, said signal connection portion being constructed so that one receiving port of a working input/output portion of the non-failure side is connected to one receiving port of a protection input/output portion of the non-failure side, in order to transmit signals from the non-failure side to the failure side; and, said signal connection portion being constructed so that a second transmission port of a protection input/output portion of the non-failure side is substituted for a backplane signal connection from the failure side and connected by way of said intercrossing means to second receiving ports of the non-failure side protection input/output portion, in order to transmit a signal from the failure side to the non-failure side.

7. The system in accordance with claim 18, wherein said signal connection portion comprises a unidirectional path switched ring, said signal connection portion being connected so that a signal from one transmission port of one working input/output portion among the input/output portions forming a working/protection pair is connected by way of said signal intercrossing means to one receiving port of the working input/output portion.

8. The system in accordance with claim 18, wherein said signal connection portion comprises a bidirectional line switched ring using four optical fibers, said signal connection portion being constructed so that one transmission port of a first working input/output portion among the input/output portions forming a working/protection pair is connected way of said signal intercrossing means to receiving ports of a second working/protection pair from among the input/output portions, and one transmission port of the second working input/output portion is connected by way of said signal intercrossing means to the receiving ports of the first working input/output portion and the first protection input/output portion.

9. The system in accordance with claim 18, wherein said signal connection portion comprises a bidirectional line switched ring using four optical fibers formed at one side in a failure state, said signal connection portion being constructed so that one receiving port of a working input/output portion of the failure side is connected to another receiving port of a protection input/output portion of the non-failure side, in order to transmit signals from the non-failure side to the failure side; and, said signal connection portion being constructed so that a second transmission port of a protection input/output portion of the non-failure side is substituted for a backplane signal connection from the failure side and connected by way of said intercrossing means to second receiving ports of the non-failure side working input/output portion and the non-failure side protection input/output portion, in order to transmit a signal from the failure side to the non-failure side.

10. The system in accordance with claim 18, said signal connection portion comprising a bidirectional line switched ring using four optical fibers formed at an intermediate node in a failure state, said signal connection portion being constructed so that one transmission port of a working input/output portion of a first side is connected by way of said signal intercrossing means to each of the receiving ports of the protection input/output portion and the working input/output portion of a second side, and one transmission port of a protection input/output portion of the second side is connected to a receiving port of the protection input/output portion the first side, in order to transmit a signal from the first side to the second side; and, said signal connection portion being constructed so that one transmission port of the working input/output portion of the second side is connected by way of said signal intercrossing means to each of the receiving ports of the working input/output portion and the protection input/output portion of the second side, and one transmission port of a protection input/output portion of the first side is connected to a receiving port of the protection input/output portion of the second side.

11. The system in accordance with claim 18, wherein said signal connection portion comprises a bidirectional line switched ring using two optical fibers, said signal connection portion being constructed so that one transmission port of a first protection input/output portion among the input/output portions forming a working/protection pair is connected by way of said signal intercrossing means to receiving ports of a second protection input/output portion from a working/protection pair, and one transmission port of the second working input/output portion is connected by way of said signal intercrossing means to the receiving ports of the first protection input/output portion.

12. The system in accordance with claim 18, wherein said signal connection portion comprises a bidirectional line switched ring using two optical fibers formed at one side in a failure state, said signal connection portion being constructed so that one receiving port of a working input/output portion of the non-failure side is connected to another receiving port of a protection input/output portion of the non-failure side, in order to transmit signals from the non-failure side to the failure side; and, said signal connection portion being constructed so that a second transmission port of a protection input/output portion of the non-failure side is substituted for a backplane signal connection from the failure side and connected by way of said intercrossing means to second receiving ports of the non-failure side protection input/output portion, in order to transmit a signal from the failure side to the non-failure side.

13. The system in accordance with claim 18, wherein said signal connection portion comprises a unidirectional path switched ring, said signal connection portion being connected so that a signal from one transmission port of one working input/output portion among the input/output portions forming a working/protection pair is connected by way of said signal intercrossing means to one receiving port of the working input/output portion.

* * * * *